United States Patent [19]
Jaspers

[11] 3,959,241
[45] May 25, 1976

[54] VINYL CHLORIDE POLYMERS AND COPOLYMERS

[75] Inventor: Hans Jaspers, Diepenreen, Netherlands

[73] Assignee: Koninklijke Industrieele Maatschappij Noury & van der Lande N.V., Deventer, Netherlands

[22] Filed: Sept. 15, 1971

[21] Appl. No.: 180,716

[30] Foreign Application Priority Data
Sept. 25, 1970 Netherlands.................... 7014141

[52] U.S. Cl................................ 526/232; 526/319; 526/343; 526/344; 526/345
[51] Int. Cl.² ........................................ C08F 14/06
[58] Field of Search................ 260/92.8 R, 85.5 F, 260/DIG. 28, 87.5 R

[56] References Cited
UNITED STATES PATENTS

| | | | |
|---|---|---|---|
| 2,419,347 | 4/1947 | Folt et al. | 260/DIG. 28 |
| 2,658,057 | 11/1953 | Park | 260/92.8 R |
| 3,222,327 | 12/1965 | Guillet et al. | 260/DIG. 28 |
| 3,522,290 | 7/1970 | Gerritsen et al. | 260/92.8 R |
| 3,539,544 | 11/1970 | Marbach et al. | 260/92.8 R |
| 3,637,633 | 1/1972 | Dixon et al. | 260/92.8 R |

*Primary Examiner*—Harry Wong, Jr.
*Attorney, Agent, or Firm*—Stevens, Davis, Miller & Mosher

[57] ABSTRACT

A process is disclosed for the preparation of polymers and copolymers of vinyl choride, which comprises polymerizing vinyl chloride or copolymerizing vinyl chloride and monomers copolymerizable therewith in the presence of a peroxide having the general formula

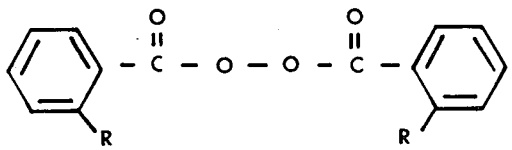

wherein R represents an alkyl- or an alkoxy-group having from 1-6 carbon atoms as an initiator. The initiator is used in an amount of 0.01 to 1.0% by weight, calculated on the monomer or monomer mixture. The foregoing peroxide may be used in combination with another structurally similar peroxide or with other peroxides also capable of polymerizing or copolymerizing vinyl chloride in an amount of 0.01 to 0.1% by weight, calculated on the monomer or monomer mixture.

1 Claim, 1 Drawing Figure

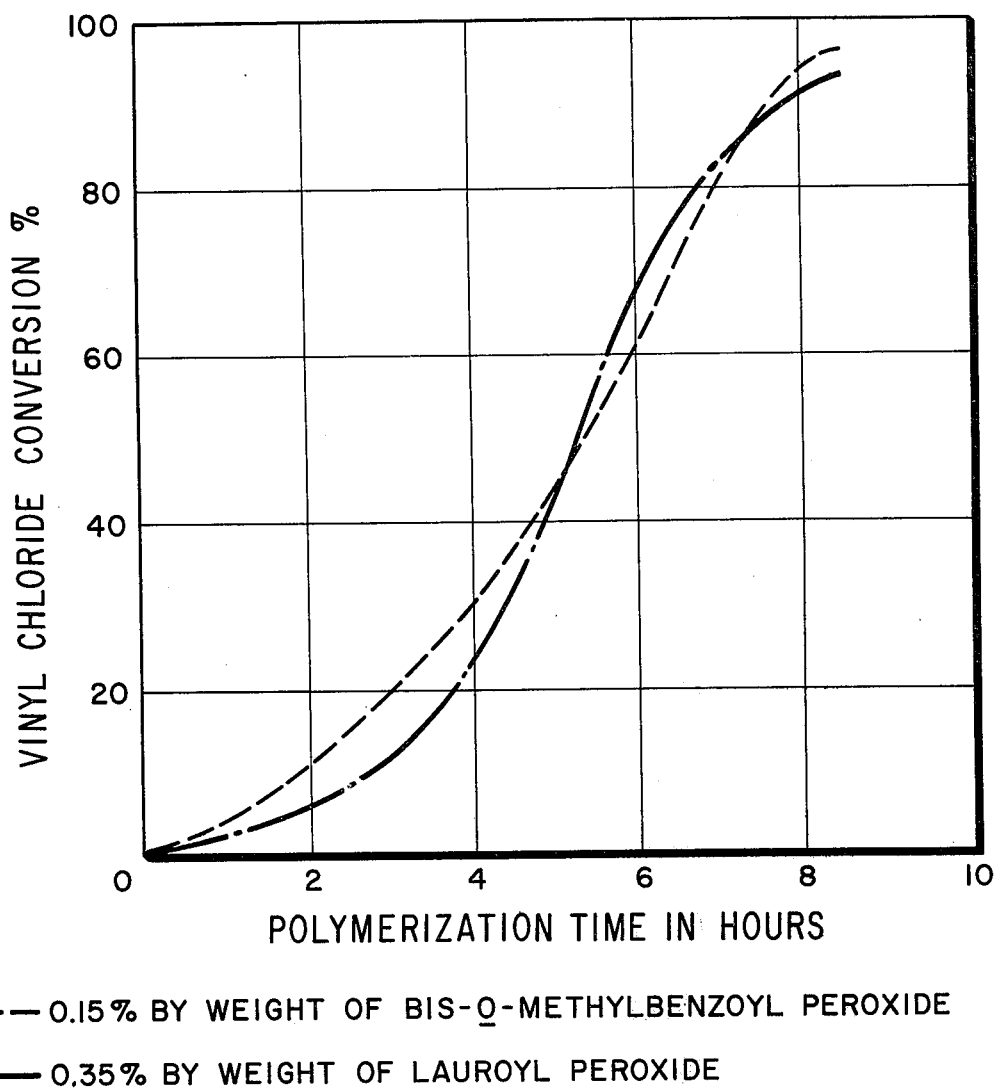

VINYL CHLORIDE POLYMERS AND COPOLYMERS

The present invention relates to a process for the preparation of polymers and copolymers of vinyl chloride in the presence of a peroxidic initiator.

It is well known that vinyl chloride and monomers copolymerizable therewith may be polymerized in the presence of a peroxidic initiator at a temperature ranging from 40° to 70° C. This polymerization or copolymerization may be carried out as a suspension or mass polymerization.

Copolymerizable monomers which may be mentioned by way of example include vinyl acetate, vinylidene chloride, ethylene, propylene, and vinyl ethers such as vinyl cetyl ether. The monomer mixture to be polymerized may contain 0-75% of copolymerizable monomers. For simplicity, it is to be understood that references herein to polymerization include copolymerization where appropriate.

Lauroyl peroxide is often used for the polymerization of vinyl chloride. However, this peroxide has the disadvantage that, at the temperature range usually employed, relatively large quantities of peroxide must be used so that one may employ polymerization times which are acceptable in practice. These relatively large quantities have the disadvantage that the thermal properties of the finished product are affected unfavorably.

In the polymerization of vinyl chloride, it has already been proposed to use a combination of lauroyl peroxide with acetyl cyclohexane sulfonyl peroxide in order to shorten the polymerization time. However, this combination of initiators has not completely fulfilled expectations.

It has now been found that peroxides having the general formula

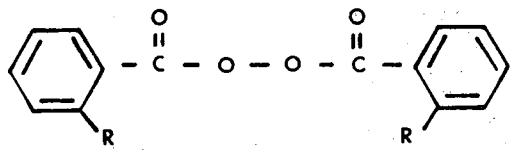

wherein R represents an alkyl- or alkoxy-group having from 1-6 carbon atoms, are excellently suitable for use as an initiator in the peroxidic polymerization and copolymerization, respectively, of vinyl chloride and mixtures containing vinyl chloride and monomers copolymerizable therewith. It has been discovered that these peroxides have a greater reactivity for this purpose than lauroyl peroxide and, moreover, that the polymerization or copolymerization proceeds more evenly.

The bis-o-alkylbenzoylperoxides and bis-o-alkoxybenzoylperoxides to be used according to the present invention may be incorporated as such in the monomer or monomer mixture. They may also be added in the form of a solution in toluene, with a conventional plasticizer such as dibutyl phthalate, or in petroleum spirit. The quantities to be used vary from 0.01 to 1% by weight, and preferably from 0.025 to 0.5% by weight, calculated on the monomer or monomer mixture.

In addition to the bis-benzoylperoxides to be used according to the present invention, peroxydicarbonates such as diethyl peroxydicarbonate, diisopropyl peroxydicarbonate and bis(4-tert.butyl-cyclohexyl)peroxydicarbonate, as well as non-peroxydicarbonates such as diisobutyryl peroxide and acetyl cyclohexane sulfonyl peroxide, may be incorporated in the monomer or monomer mixture. These other peroxides, with which the bis-o-alkylbenzoylperoxides and bis-o-alkoxybenzoylperoxides according to the present invention may be combined, are employed in quantities varying from 0.01 to 0.1% by weight, calculated on the monomer.

The following examples still further illustrate this invention.

EXAMPLE I a. 0.36 g. of polyvinyl alcohol (of the type Elvanol 50–42) in 360 ml. of water were put into a 1 liter autoclave. Subsequently, the autoclave was exhausted by suction and then 0.3 g. of bis-o-methylbenzoyl peroxide in 200 g. of vinyl chloride were added. The internal temperature of the autoclave was raised to 55° C. with stirring. 7.5 hours after the start of the polymerization, the reaction was stopped and then the conversion was measured. 180 g. of polyvinyl chloride were obtained, corresponding to a conversion of 90% calculated on the initial vinyl chloride.

b. The above polymerization of vinyl chloride was repeated, using 0.7 g. of lauroyl peroxide instead of 0.3 g. of bis-o-methylbenzoyl peroxide. 180 g. of polyvinyl chloride were obtained which corresponds to a conversion of 90%. The course of the polymerization is less favorable, however, as the accompanying drawing shows. This is a graph of percentage conversion plotted against time. It will be seen that the initiator of the invention is more effective, especially in the early part of the reaction.

c. The above polymerization of vinyl chloride was repeated at temperatures of 50°, 60° and 65° C., respectively, using as initiator both bis-o-methylbenzoyl peroxide and lauroyl peroxide. The quantities of initiator used, the polymerization time, and the conversion measured are set out in Table 1.

TABLE 1

| peroxide | % by weight | temp. °C. | time in hours | conversion % |
|---|---|---|---|---|
| bis-o-methylbenzoyl | 0.2 | 50 | 9 | 85 |
| lauroyl | 0.4 | 50 | 10 | 70 |
| bis-o-methylbenzoyl | 0.05 | 60 | 8.5 | 87 |
| lauroyl | 0.1 | 60 | 9.5 | 86 |
| bis-o-methylbenzoyl | 0.05 | 65 | 6 | 85 |
| lauroyl | 0.15 | 65 | 6.5 | 85 |

EXAMPLE II

In an analogous way to that described in Example I, vinyl chloride was polymerized with a combination of peroxides consisting of bis-o-methylbenzoyl peroxide (b) and acetyl cyclohexane sulfonyl peroxide (a); a combination consisting of lauroyl peroxide (1) and acetyl cyclohexane sulfonyl peroxide (a); a combination consisting of bis-o-methylbenzoyl peroxide (b) and bis(4-tert.butylcyclohexyl)peroxydicarbonate (c); and a combination consisting of lauroyl peroxide (1) and bis(4-tert.butylcyclohexyl)peroxydicarbonate (c). The quantities of peroxides used, the polymerization times, and the conversions measured are set out in Table 2.

TABLE 2

| combination of peroxides | % by weight respectively | temp. °C. | time in hours | % conversion |
|---|---|---|---|---|
| b + a | 0.1 + 0.2 | 50 | 8 | 88 |
| 1 + a | 0.2 + 0.02 | 50 | 9.5 | 88 |
| 1 + a | 0.1 + 0.02 | 50 | 13 | 87 |
| b + c | 0.025 + 0.02 | 61 | 12 | 85 |
| 1 + c | 0.05 + 0.02 | 61 | 12 | 75 |

EXAMPLE III 60 g. of vinyl chloride were put into a 200 ml. autoclave and then a combination of 0.06 g. of bis-o-methylbenzoyl peroxide and 0.012 g. of acetyl cyclohexane sulfonyl peroxide dissolved in 1 ml. of benzene was added. While the autoclave was rotating, the internal temperature was brought to 55° C. The polymerization was stopped after 6 hours. After cooling, the autoclave was opened. After the unreacted monomer had been evaporated, 53 g. of polyvinyl chloride were obtained, which corresponds to a conversion of 88% calculated on the initial vinyl chloride.

EXAMPLE IV 0.36 g of polyvinyl alcohol (of the type Elvanol 50-42) in 360 ml. of water were put into a 1 liter autoclave. Subsequently, the autoclave was exhausted by suction and then 30 g. of vinyl acetate and subsequently 170 g. of vinyl chloride, in which 0.3 g. of bis-o-methylbenzoyl peroxide were dissolved, were added. The internal temperature of the autoclave was brought to 55° C. with stirring. After 8 hours, the copolymerization was ended. 188.5 g. of copolymerizate were obtained, which corresponds to a conversion of 94.2% calculated on the starting monomers.

EXAMPLE V

In an analogous way to that described in Example IV, a monomer mixture consisting of 50 g. of vinyl chloride and 150 g. of vinylidene chloride was polymerized at a temperature of 50° C. and a polymerization time of 48 hours in the presence of 1 g. of bis-o-methylbenzoyl peroxide. 140 g. of copolymerizate were obtained, which corresponds to a conversion of 70% calculated on the starting monomers.

A comparative experiment under otherwise similar conditions but with 1 g. of lauroyl peroxide as initiator, gave a conversion of 44%.

EXAMPLE VI 0.36 g. of polyvinyl alcohol (of the type Elvanol 50-42) in 360 ml. of water were put into a 1 liter autoclave. The pH of the solution was adjusted to 10. Subsequently, the autoclave was exhausted by suction and then 0.073 g. of bis-o-methylbenzoyl peroxide in 200 g. of vinyl chloride were added. The internal temperature of the autoclave was raised to 55° C. with stirring. 8 hours after the start of the polymerization, the reaction was stopped and then the conversion was measured. 170 g. of polyvinylchloride were obtained, corresponding to a conversion of 85% calculated on the initial vinyl chloride.

EXAMPLE VII

In an analogous way to that described in Example VI, vinyl chloride was polymerized with a combination of peroxides consisting of bis-o-methoxy benzoylperoxide (d) and bis-o-methylbenzoyl peroxide (b) in various ratios and at various temperatures. The quantities of initiators used, the polymerization times, and the conversions measured are set out in Table 3.

TABLE 3

| combination of peroxides | % by weight respectively | temp. °C. | time in hours | % conversion |
|---|---|---|---|---|
| b + d | 0.025 + 0.015 | 60 | 12 | 87 |
| b + d | 0.02 + 0.018 | 60 | 8 | 85 |
| b + d | 0.03 + 0.036 | 50 | 8 | 85 |
| b + d | 0.06 + 0.015 | 50 | 12 | 85 |

What is claimed is:

1. A process for the preparation of homopolymers of vinyl chloride or copolymers of vinyl chloride with copolymerizable monomers, which comprises
    polymerizing in mass or in suspension
    a monomeric material selected from the group consisting of vinyl chloride and mixtures of vinyl chloride with copolymerizable monomers, said mixtures containing at least 25% of vinyl chloride
    in the presence of bis-o-methylbenzoyl peroxide in an amount sufficient for initiating the polymerizing reaction.

* * * * *